(12) United States Patent
Chen et al.

(10) Patent No.: US 7,251,222 B2
(45) Date of Patent: Jul. 31, 2007

(54) PROCEDURES FOR MERGING THE MEDIATION DEVICE PROTOCOL WITH A NETWORK LAYER PROTOCOL

(75) Inventors: Priscilla Chen, Sunrise, FL (US); Masahiro Maeda, Tokyo (JP); Edgar H. Callaway, Jr., Boca Raton, FL (US); Monique Bourgeois, Plantation, FL (US); Yan Huang, Plantation, FL (US); Jiang Huang, Coral Springs, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 1016 days.

(21) Appl. No.: 10/022,935

(22) Filed: Dec. 18, 2001

(65) Prior Publication Data

US 2003/0007461 A1    Jan. 9, 2003

Related U.S. Application Data

(60) Provisional application No. 60/291,140, filed on May 15, 2001.

(51) Int. Cl.
*H04L 12/28* (2006.01)
*H04J 3/16* (2006.01)
*G06F 15/16* (2006.01)

(52) U.S. Cl. ............... 370/256; 370/408; 370/432; 370/469; 709/220; 709/252

(58) Field of Classification Search ............. 370/256, 370/408, 432, 469
See application file for complete search history.

(56) References Cited

U.S. PATENT DOCUMENTS

| | | | |
|---|---|---|---|
| 4,313,036 A | 1/1982 | Jabara et al. |
| 5,079,767 A | 1/1992 | Perlman |
| 5,128,938 A | 7/1992 | Borras |
| 5,241,542 A | 8/1993 | Natarajan et al. |
| 5,278,831 A | 1/1994 | Mabey et al. |
| 5,371,734 A | 12/1994 | Fischer |
| 5,418,835 A | 5/1995 | Frohman et al. |
| 5,533,100 A | 7/1996 | Bass et al. |
| 5,590,396 A | 12/1996 | Henry |
| 5,740,366 A | 4/1998 | Mahany et al. |
| 5,778,052 A | 7/1998 | Rubin et al. |
| 5,797,094 A | 8/1998 | Houde et al. |
| 5,845,204 A | 12/1998 | Chapman et al. |
| 5,850,592 A | 12/1998 | Ramanathan |
| 5,940,771 A | 8/1999 | Gollnick et al. |
| 5,943,397 A | 8/1999 | Gabin et al. |

(Continued)

OTHER PUBLICATIONS

Gerla, M., Multicluster, Mobile, Multimedia Radio Network, Wireless Networks 1 (1995) pp. 255-265.

(Continued)

*Primary Examiner*—Alpus H. Hsu

(57) ABSTRACT

A process for merging and using the Mediation Device Protocol with a network layer protocol. Under the merged protocol, each device joining a network enters into two stages: the Set-Up Stage and the Normal Operational Stage. During the Set-Up Stage, the device identifies its neighbors, builds a neighborhood list, obtains a Logical ID, and picks a parent node in the network. After the Set-Up Stage is complete, the device enters the Normal Operational Stage where it will send/receive control and data messages, invite and help new nodes to join the network, recover from broken links or topology changes, and other normal network operations.

26 Claims, 4 Drawing Sheets

U.S. PATENT DOCUMENTS

| | | | |
|---|---|---|---|
| 5,991,287 | A | 11/1999 | Diepstraten et al. |
| 6,044,069 | A | 3/2000 | Wan |
| 6,047,200 | A | 4/2000 | Gibbons et al. |
| 6,055,561 | A * | 4/2000 | Feldman et al. ............ 709/200 |
| 6,058,289 | A | 5/2000 | Gardner et al. |
| 6,134,599 | A | 10/2000 | Chiu et al. |
| 6,138,019 | A | 10/2000 | Trompower et al. |
| 6,192,230 | B1 | 2/2001 | van Bokhorst et al. |
| 6,205,122 | B1 | 3/2001 | Sharon et al. |
| 6,208,623 | B1 | 3/2001 | Rochberger et al. |
| 6,259,772 | B1 | 7/2001 | Stephens et al. |
| 6,269,404 | B1 * | 7/2001 | Hart et al. .................. 709/238 |
| 6,285,892 | B1 | 9/2001 | Hulyalkar |
| 6,304,556 | B1 | 10/2001 | Haas |
| 6,351,522 | B1 | 2/2002 | Vitikainen |
| 6,353,596 | B1 * | 3/2002 | Grossglauser et al. ...... 370/256 |
| 6,356,538 | B1 | 3/2002 | Lin |
| 6,370,146 | B1 | 4/2002 | Higgins et al. |
| 6,377,987 | B1 | 4/2002 | Kracht |
| 6,385,174 | B1 | 5/2002 | Lin |
| 6,385,201 | B1 | 5/2002 | Iwata |
| 6,418,299 | B1 | 7/2002 | Ramanathan |
| 6,456,599 | B1 | 9/2002 | Elliott |
| 6,457,048 | B2 | 9/2002 | Sondur et al. |
| 6,473,408 | B1 * | 10/2002 | Rochberger et al. ........ 370/255 |
| 6,493,759 | B1 | 12/2002 | Passman et al. |
| 6,636,499 | B1 | 10/2003 | Dowling |
| 6,694,361 | B1 | 2/2004 | Shah et al. |
| 6,791,949 | B1 | 9/2004 | Ryu et al. |
| 6,816,460 | B1 | 11/2004 | Ahmed et al. |
| 6,829,222 | B2 | 12/2004 | Amis et al. |
| 6,836,463 | B2 | 12/2004 | Garcia-Luna Aceves et al. |
| 6,845,091 | B2 | 1/2005 | Ogier et al. |
| 6,876,643 | B1 | 4/2005 | Aggarwal et al. |
| 6,889,254 | B1 * | 5/2005 | Chandra et al. ............ 709/224 |
| 6,973,053 | B1 | 12/2005 | Passman et al. |
| 6,982,960 | B2 * | 1/2006 | Lee et al. ................... 370/254 |
| 2002/0018488 | A1 | 2/2002 | Amis et al. |
| 2002/0031131 | A1 * | 3/2002 | Yemini et al. .............. 370/401 |
| 2002/0163889 | A1 * | 11/2002 | Yemini et al. .............. 370/238 |
| 2002/0169846 | A1 | 11/2002 | Chen et al. |

OTHER PUBLICATIONS

Boukerche, A., A Simulation Based Study of On-Demand Routing Protocols for Ad hoc Wireless Networks, Simulation Symposium, 2001, Proceedings, 34th Annual, Apr. 22-26, 2001, pp. 95-92.

Lee, W.C., Topology Agregation for Hierarchical Routing in ATM Netowrks, Computer Communication Review, vol. 25, No. 2, Apr. 1995, pp. 82-92, ACM Press.

Jiandong, L., An Adaptive Cluster Algorithm for a Self-Organizing Communication Network, Global Telecommunications Conference, 1988, Nov. 28-Dec. 1, 1988, Conference Record, GLOBECOM '88, IEEE, vol. 3, pp. 1653-1656.

Lin, H., A Clustering Technique for Large Multihop Mobile Wireless Networks, Vehicular Technology Conference proceedings, 2000 IEEE 51st, vol. 2., pp. 1545-1549.

Yong-Xi, F., A Clustering Algorithm Applied to the Network Management on Mobile Ad hoc Network, Info-tech and Info-net, 2001, Proceedings, ICii 2001, vol. 2, pp. 626-631.

Chatterjee, M., An On-Demand Weighted Clustering Algorithm (WCA) for Ad hoc Networks, Global Telecommunications Conference, 2000, GLOBECOM '00, IEEE vol. 3, Nov. 27-Dec. 1, 2000, pp. 1697-1701.

* cited by examiner

PROCEDURES FOR MERGING THE MEDIATION DEVICE PROTOCOL WITH A NETWORK LAYER PROTOCOL

1. CROSS REFERENCE TO RELATED DOCUMENTS

This application claims the benefit of U.S. provisional application No. 60/291,140, "Procedures for Merging the Mediation Device Protocol with a Network Layer Protocol", filed May 15, 2001.

This application is related to pending application Ser. No. 09/803,259 filed Mar. 9, 2001 for "A Protocol for a Self-Organizing Network Using a Logical Spanning Tree" and to co-pending application Ser. No. 09/803,322, filed Mar. 9, 2001 for "A Multiple Access Protocol and Structure for Communication Devices in an Asynchronous Network". These applications are hereby incorporated by reference.

2. TECHNICAL FIELD

This invention relates to the field of wireless communications networks, such as wireless personal area networks (WPANs), and specifically to procedures for allowing networks operating under the mediation device protocol to be merged and used with networks operating under a network layer protocol.

3. BACKGROUND OF THE INVENTION

Many applications for wireless communication networks, such as wireless sensors, industrial control and monitoring, intelligent agriculture, asset and inventory tracking, and security, would benefit from a communication protocol that produced an ad-hoc, self-organizing network (i.e. one with a random topology in which the network organization and maintenance occurred without human intervention) that enables each node in the network to be inexpensive and to have low power consumption in all possible connection states. The Cluster Tree Protocol is a protocol for the logical link and network layers for a wireless ad-hoc network designed to meet the above requirements. The Cluster Tree Protocol is described in "Cluster Tree Protocol (ver.0.53)", by Masahiro Meada, April, 2001, which is hereby incorporated by reference The protocol uses link-state packets to form either a single cluster network, or a potentially larger cluster tree network. The network is basically self-organizing and supports network redundancy to attain a degree of fault tolerance and self repair. Nodes within the network select a cluster head and form a cluster according to the self-organized manner. In the cluster formation process the cluster head assigns a unique node identifier (ID) to each member node. Self-developed clusters connect to each other using a Designated Device, that is a special node with a high computing ability and large memory space. In many applications the Designated Device is also the gateway between the network and the Internet. The Designated Device assigns a unique cluster ID to each cluster.

Low power consumption is achieved, in part, by each network device having a low duty cycle. For example, a device may be active for only 0.1% of each cycle. However, for asynchronous systems, a low duty cycle makes it difficult for devices to synchronize with one another. For instance, if device A tries to contact device B, there is a high probability that device B is inactive or 'sleeping'. The problem is compounded by the use of low cost crystal oscillators and on-chip Micro Electro-Mechanical System (MEMS) resonators for timing. The poor frequency performance of these devices increases the need for regular re-synchronization. The Mediation Device Protocol was introduced to enable low duty cycle devices to communicate with each other without requiring a high accuracy synchronization reference, thus overcoming the issue of poor frequency stability. The Mediation Device Protocol is described in detail in "Mediation Device Operation", Qicai Shi, Ed Callaway, Document IEEE 802.15-01/1880r0, which is hereby incorporated by reference. A mediation device has a relatively long receive period, during which it can record messages in the network. The recorded messages are then played-back to other devices in the network. Hence, the mediation device acts as an "answering machine".

In order to obtain the benefits of both the Mediation Device Protocol and network layer protocols such as the Cluster Tree Protocol, the protocols must be merged. Consequently, there is an unmet need for a process for merging and using the Mediation Device Protocol with a network layer protocol.

4. BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

5. DETAILED DESCRIPTION OF THE INVENTION

This present invention relates to a process for merging and using the Mediation Device Protocol with a network layer protocol. The Cluster Tree Protocol is used as an example for a network layer protocol, but it will be apparent to those of ordinary skill in the art how the Mediation Device Protocol may be merged and used with other network layer protocols, since equivalent steps can be used between any network layer protocol and the Mediation Device Protocol. The Mediation Device Protocol is described in detail in "Mediation Device Operation", Qicai Shi, Ed Callaway, Document IEEE 802.15-01/1880r0. A Cluster Tree Protocol is described in "Cluster Tree Protocol (ver.0.53)", Masahiro Meada, April, 2001.

Under the protocol of the present invention, each device joining a network will enter into two stages: the Set-Up Stage and the Normal Operational Stage. During the Set-Up Stage, the device will discover whom its neighbors are, build a neighborhood list, obtain a Logical ID, and pick a parent. After the Set-Up Stage is complete, the device enters the Normal Operational Stage where it will send/receive control and data messages, invite and help new nodes to join the network, recover from broken links or topology changes, and other normal network operations.

5.1. Set-Up Stage

Figure 1:
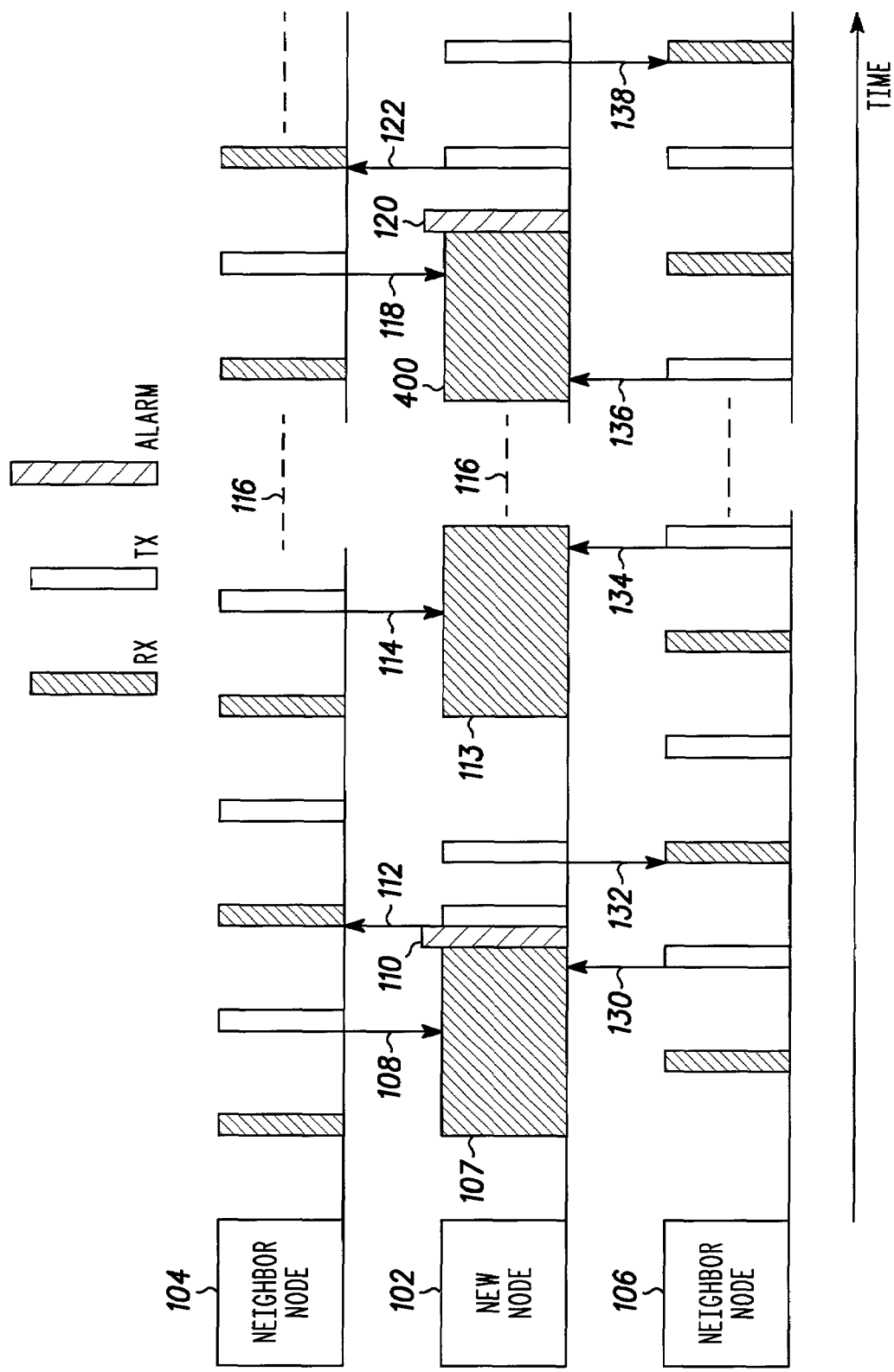
FIG. 1 is a timing diagram illustrating an embodiment of the set-up stage of the present invention.

Every node enters a network in the Set-Up Stage. The timing diagram for this stage is shown in FIG. 1. Referring to FIG. 1, the operations of a new network node 102 joining the network and two existing network nodes, 104 and 106, are shown. The transmit (Tx) and receive (Rx) periods for the new node are similar to a Mediation Device (MD), except that initially the new node 102 is in a receive mode 107 and does not relay any messages. The new node stays in this stage until the entire network set-up procedure is done. This means the node will stay "awake" until it has built its neighborhood list, picked a parent, and has been assigned a Logical ID (CID and NID in the Cluster Tree Protocol). The existing nodes, 104 and 106, alternate between Tx and Rx modes, each separated by a period is inactivity, during which the node is "asleep".

5.1.1. Discovering Neighbors

Figure 2:
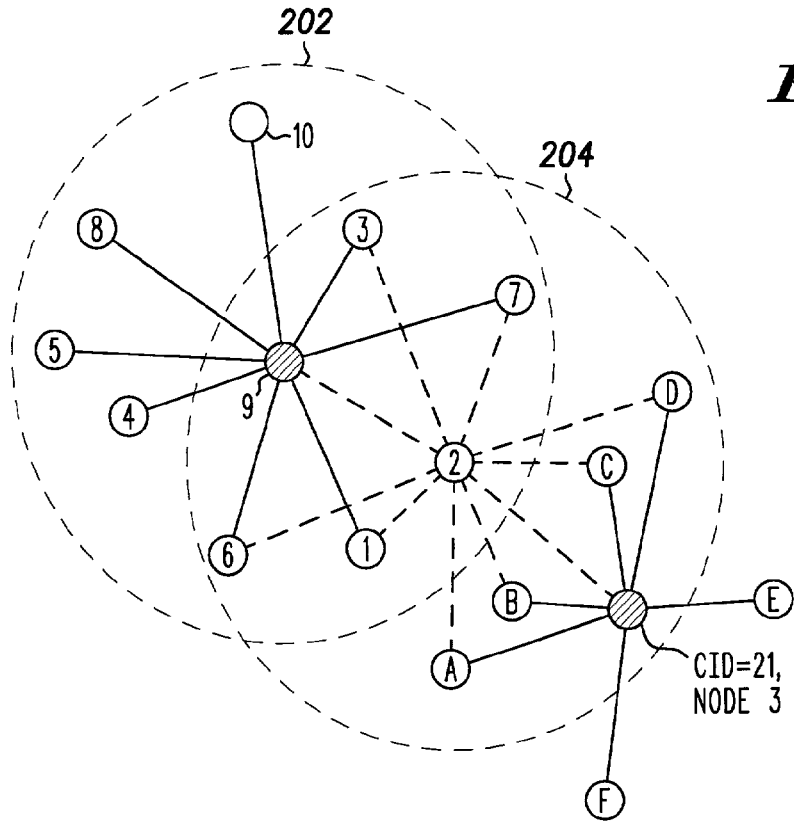
FIG. 2 is a network topology diagram illustrating the merging of a node into a network in accordance with the present invention.

Referring to FIG. 1, upon entering the network, a new node 102 will listen for a period of time (2 seconds for example). It will collect information about its immediate (1-hop) neighbors by listening to all the messages in the channel. The information collected includes the neighbors' logical IDs, what time they will receive or transmit again, and their depth or load information if available. This information is recorded in the new node's initial neighborhood list. For example, the new node may receive a "Hello" message 108 transmitted from the neighbor node 104 or a "Hello" message 130 transmitted from the neighbor node 106. FIG. 2 shows an example network topology, with Node 2 being the new node. Node 9 is the cluster head for a cluster with cluster identifier (CID) 0. Node 1 and nodes 3-10 form the cluster. These nodes are denoted by the logical identifiers 0,0, 0,3, 0,4, 0,5, 0,6 etc. The circle 202 depicts the transmission range of the cluster head 9. The circle 204 depicts the transmission range of Node 2.

A second cluster is denoted with CID 21 and has node 3 as its cluster head, with the logical ID 21,3.

Table 1 shows Node 2's initial neighborhood list. Note that the first neighboring node that the new node hears will be the first node listed on the neighborhood list.

TABLE 1

An initial neighborhood list of Node 2 in FIG. 1.

| Logical ID | Next Rx/Tx Time | Depth | Load Parameter |
|---|---|---|---|
| 0, 0 | 431 | 0 | 9 |
| 0, 7 | 456 | 1 | ... |
| . | . | . | . |
| . | . | . | . |
| 21, 3 | 678 | ... | ... |

Since the messages heard from neighbors may be "Hello", control, or normal data packages, the Depth and Load parameters of some neighbors may not be available at this time. However, this is not a problem since only the Logical ID (or a MAC address) of the neighbors and their next Rx/Tx time are necessary at this step.

5.1.2. Confirm Symmetric Links with Neighbors

Referring again to FIG. 1, after listening for a period, the new node 102 will send out an alarm message 110, informing any MD in its transmission range 204 to suspend transmission for the next period. The new node follows this alarm message with a Tx period in which it will send a "Connection Request" (CON REQ) message 112 to its neighbor 104 and a "Connection Request" 132 to its neighbor node 106 during each of their corresponding Rx time. After receiving the "Connection Request" message 112 from the new node, the neighbor 104 will send a "Connection Response" (CON RES) message 114 and the neighbor 106 will send a "Connection Response" message 134 in their next Tx periods. In this "Connection Response" message, the neighboring nodes will send in their Logical ID, Next Rx/Tx time, Depth, and Load Parameter to the new node, allowing the neighborhood list to be updated.

In U.S. patent application Ser. No. 09/803,259, "A Protocol for a Self-Organizing Network Using a Logical Spanning Tree Backbone", filed Mar. 9, 2001, the "Connection Request" message is referred to as an "X" message and the "Connection Response" message is referred to as a "Y" message.

For the new node, after the "CON REQ" period, it will enter a second Rx period 113 listening for all the "CON RES" responses (114 and 134) from its neighbors. The new node will also update all the parameters in its neighborhood list. Any neighbors who did not send in a "CON RES" at the end of this period will be deleted from the neighborhood list. This will eliminate any nodes with asymmetric links from the neighborhood table. Table 2 shows the new node's neighborhood list after this period.

TABLE 2

A complete neighborhood list of a new node after Set-up Step.

| Logical ID | Next Rx/Tx Time | Depth | Load Parameter |
|---|---|---|---|
| 0, 0 | 431 | 0 | 9 |
| 0, 7 | 456 | 1 | 1 |
| . | . | . | . |
| . | . | . | . |
| 21, 3 | 678 | 1 | 6 |

5.1.3. Obtain Logical IDs and Pick a Parent

After the neighborhood table is updated, the new node will try to obtain a Logical ID and pick a parent for itself. The procedure for this is highly dependent on the network layer protocol, as well as which MD mode (Dedicated MD or Distributed MD for example) the system is using.

5.1.3.1. Distributed MD with Cluster Tree Protocol

For this implementation, the new node can simply pick the first node from the neighborhood list as its parent (this is the first node that it hears and has symmetric links with). It then asks this parent to send a "Logical ID Request" to the Cluster Head. The "Logical ID Request" is referred to as a "NID REQ" in the Cluster Tree Protocol. The Cluster Head then sends a "Logical ID Response" to the parent. The parent node then relays this message to the new node. The new node now has a Logical ID and a parent, and the parent node knows that it has been picked as the new node's parent.

5.1.3.2. Dedicated MD with Cluster Tree Protocol

Figure 3:
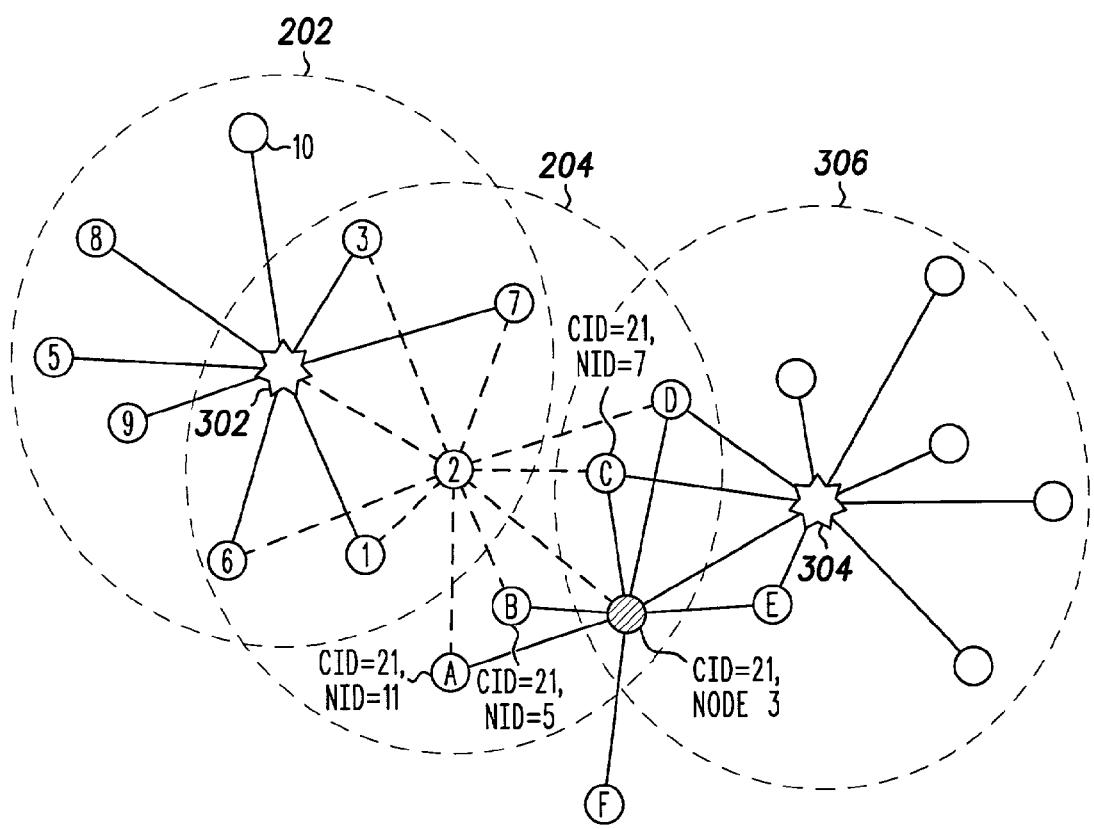
FIG. 3 is a network topology diagram illustrating the merging of a node into a network with dedicated mediation devices in accordance with the present invention.

Since Dedicated MD is used in this implementation, there can be nodes within the new node's range that are not in the dedicated MD's range. FIG. 3 shows a network with two dedicated mediation devices (MDs) 302 and 304. As shown in FIG. 3, node C, which is node 7 of the cluster with CID=21, and node 2 are immediate neighbors, but since they belong to different MD coverage areas, they can not synchronize their Tx/Rx times using the Dedicated MDs 302 and 304. Therefore, nodes of this kind should be deleted from the normal neighborhood list and be put on a "Non-sync neighbor list". The nodes in this "Non-sync neighbor list" have symmetric links with the new node, but they cannot use existing Dedicated Mediation Devices to synchronize their Tx/Rx time with it. In order to communicate with the new node, either these nodes or the new node will have to become a temporary MD to synchronize with each other's Tx/Rx time.

For this implementation, the new node needs to identify the Dedicated MD. This can be done in the initial step (107 in FIG. 1) while listening for all the messages in its communication range. The new node can identify the Dedicated MD by checking which node sends out "Replay" messages. After the Dedicated MD is identified, the new node can send a "Neighborhood List Request" (Neig List REQ) message to the Dedicated MD. The MD can then reply with a "Neighborhood List Response" (Neig List RES) message giving a list of its neighbors. The new node can then compare its "normal neighborhood list" with the MD's neighborhood list. The nodes that are not on both lists are deleted from the new node's "normal neighborhood list". These nodes are put in the "Non-sync neighbor list" of the new node.

The new node can then pick a parent from the "normal neighborhood list" and ask that parent to request a Logical ID from the Cluster Head, the same way as in the Distributed MD case.

Table 3 shows the "normal neighborhood list" of node 2 and Table 4 shows its "Non-sync neighbor list", from the topology of FIG. 3.

TABLE 3

Normal neighborhood list of Node 2 in FIG. 3.

| Logical ID | Next Rx/Tx Time | Depth | Load Parameter |
|---|---|---|---|
| 0, 0 | 431 | 0 | 9 |
| 0, 1 | 564 | 0 | 9 |
| 0, 7 | 456 | 1 | 10 |
| . | . | . | . |
| . | . | . | . |
| . | . | . | . |

TABLE 4

"Non-sync neighbor list" of Node 2 in FIG. 3.

| Logical ID | Next Rx/Tx Time | Depth | Load Parameter |
|---|---|---|---|
| 21, 7 | 798 | 2 | 12 |
| 21, 3 | 678 | 1 | 11 |
| . | . | . | . |
| . | . | . | . |
| 21, 11 | 678 | 2 | 6 |

5.1.3.3. Distributed MD with Extended NW Protocol

In this implementation, the new node picks the node with the least depth in its "normal neighborhood list" and use it as the parent. If there is a tie in the least depth, the node with the least load will be picked as the parent. The Logical ID, if used, is obtained from the "CON RES" messages as described in section 5.1.2.

5.1.3.4. Dedicated MD with Extended NW Protocol

The "normal neighborhood list" and the "Non-sync neighbor list" need to be made the same way as in section 5.1.3.2. The parent node should be picked from the "normal neighborhood list". The procedure for picking the parent and obtaining the Logical ID is the same as in section 5.1.3.3.

5.1.4. Broadcast New Status

After picking a parent and/or obtaining a Logical ID, the new node needs to inform all of its neighbors its new status. These include new Logical ID, depth, load parameter, and/or parent's ID (needed in Extended NW Protocol without Logical Address option). Again, how this step can be implemented depends on which MD mode and which network layer protocol is used.

5.1.4.1. Distributed MD with Cluster Tree Protocol

In the Cluster Tree Protocol, the time between the processes described in sections 5.1.2 and 5.1.3 above can be long if the number of hops between the new node and the Cluster Head is large. Therefore, it is inefficient for the neighbors to stay in Rx mode and wait for the new node to broadcast its Logical ID. FIG. 1 shows the timing diagram for this implementation. Referring to FIG. 1, after obtaining the Logical ID, as in section 5.1.3, the new node 102 needs to listen for a period 400, updating the timing information from its neighbors. Then it needs to be in Tx mode 120 and individually sends a "$1^{st}$ Hello" message 122 and 138 to each neighbor 104 and 106. The "$1^{st}$ Hello" message needs to contain at least the node's Logical ID. The "$1^{st}$ Hello" message may also contain the depth, load parameters and parent's ID if necessary. The neighbors can then add the new node in their neighborhood list.

5.1.4.2. Dedicated MD with Cluster Tree Protocol

In the Dedicated MD case, the procedure is almost the same as the Distributed MD case except the following:

In the "$1^{st}$ Hello" message, the Logical ID of the Dedicated MD in its area also needs to be added, in additional to the new node's Logical ID. The neighbors having the same MD as the new node, can add the new node to their "normal neighborhood lists". Otherwise, the new node is added to their "Non-synchronized neighborhood lists".

5.1.4.3. Distributed MD with Extended NW Protocol

Figure 4:
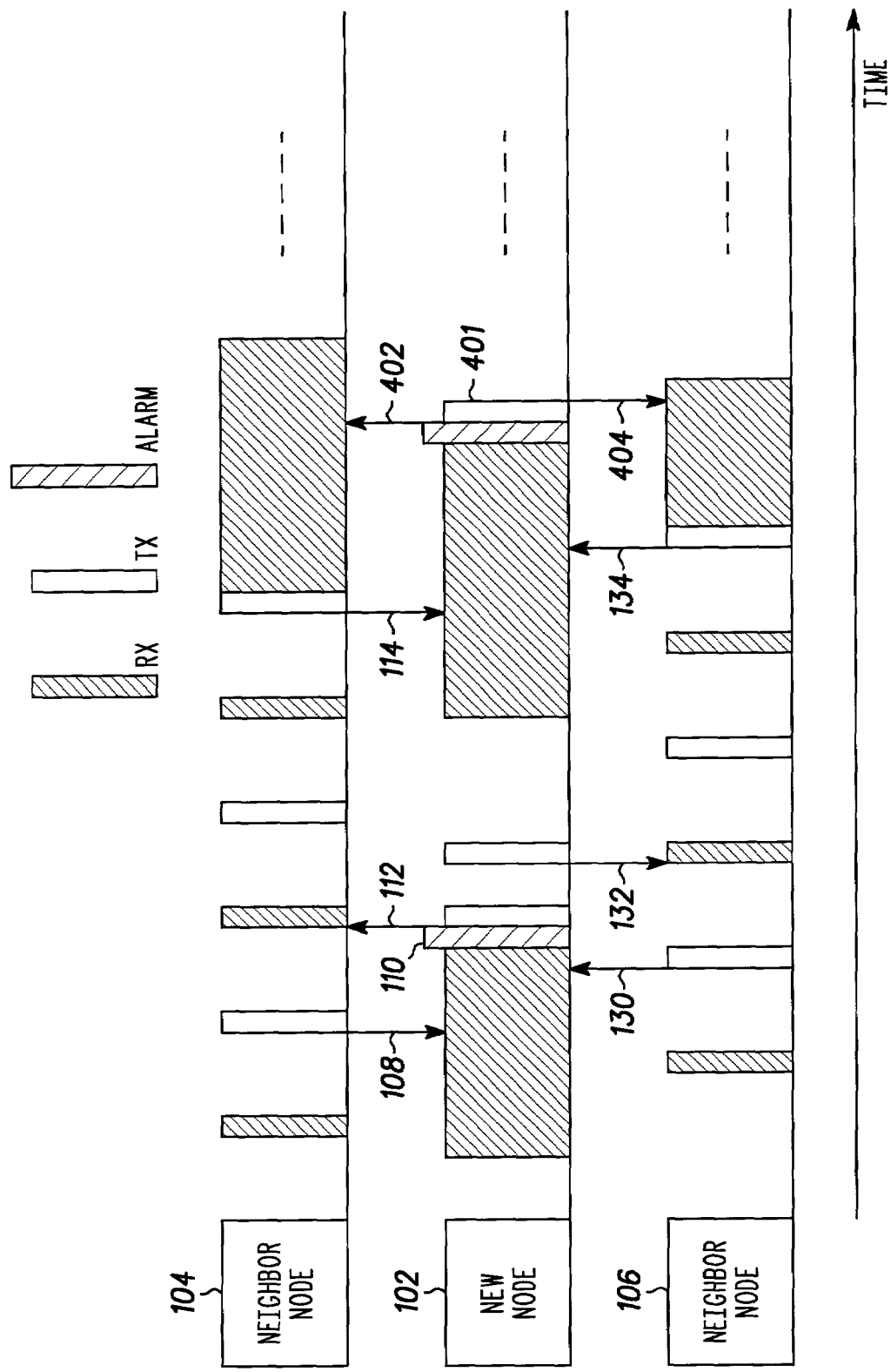
FIG. 4 is a timing diagram illustrating an embodiment of the set-up stage for an extended network protocol in accordance with the present invention.

In the Extended NW Protocol, the time between step 5.1.2 and step 5.1.3 is short due to the distributed nature in finding a parent and getting a Logical ID. The neighbors can just wait in Rx mode until the new node broadcasts a "$1^{st}$ Hello". In U.S. patent application Ser. No. 09/803,259, "A Protocol for a Self-Organizing Network Using a Logical Spanning Tree Backbone", filed Mar. 9, 2001, the "$1^{st}$ Hello" message is referred to as a "BroadcastZ" message. The timing diagram for this implementation is shown in FIG. 4. The "$1^{st}$ Hello" message, 402 and 404, in this mode needs to contain the node's Logical ID, and/or the parent's node ID and its own depth. It may also contain the load parameter if needed. After receiving the "$1^{st}$ Hello" message from the new node, the neighbors 104 and 106 add the new node to their neighborhood list.

5.1.4.4. Dedicated MD with Extended NW Protocol

The only difference between this case and that described above in 5.1.4.3 is the following:

In the "1$^{st}$ Hello" message, the Logical ID of the Dedicated MD in its area also needs to be added, in additional to the new node's Logical ID. The neighbors, having the same MD as the new node, can add the new node to their "normal neighborhood lists". Otherwise, the new node is added to their "Non-sync neighborhood lists".

The new node and its neighbors will go to the Normal Operational Stage after completion of process described in section 5.1.4 above.

5.1.5. Summary of Set-Up Stage

Figure 5:
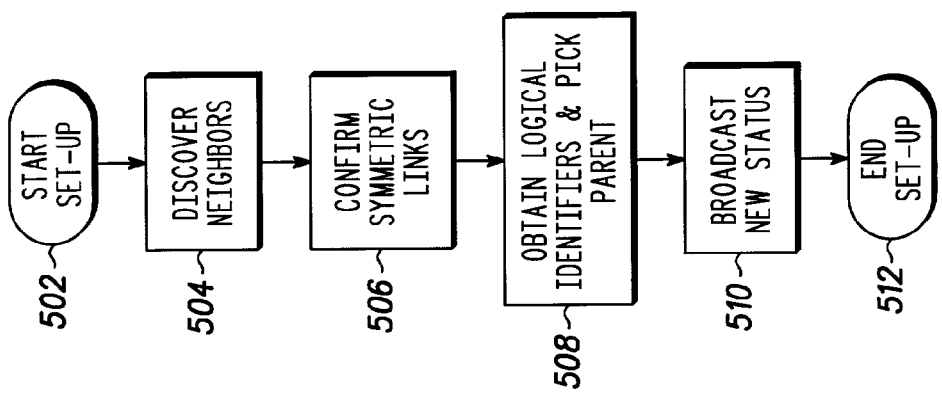
FIG. 5 is a flow chart illustrating a setup procedure in accordance with the invention.

A flow chart summarizing the set-up stage is shown in FIG. 5. A new node enters the network at start block 502. The new node then discovers its neighbors at block 504 by listening for a period of time (2 seconds for example). During this time it will collect information about its immediate (1-hop) neighbors by listening to all the messages in the channel. The information collected includes the neighbors' logical IDs, what time they will receive or transmit again, and their depth or load information if available. This information is recorded in the new node's initial neighborhood list.

At block 506, the symmetric links are confirmed. To confirm the links, the new node sends out an alarm message, informing any MD in its transmission range to suspend transmission for the next period. The new node follows this alarm message with a transmit period in which it will send a "Connection Request" (CON REQ) message to its neighbors during each of their corresponding Rx time. After receiving the "Connection Request" message from the new node, the neighbors will send a "Connection Response" (CON RES) message in their next transmit periods, thus confirming that a symmetric link is in place. In this "Connection Response" message, the neighboring nodes will send in their Logical ID, Next Rx/Tx time, Depth, and Load Parameter to the new node, allowing the neighborhood list to be updated.

After the neighborhood table is updated, at block 508, the new node will try to obtain a Logical ID and pick a parent. The procedure for this is highly dependent on the network layer protocol, as well as which MD mode (Dedicated MD or Distributed MD for example) the system is using. Various embodiments of the procedure are described above.

After picking a parent and/or obtaining a Logical ID, the new node needs to inform all of its neighbors its new status. The new status is broadcast at block 510. The status includes new Logical ID, depth, load parameter, and/or parent's ID (needed in Extended NW Protocol without Logical Address option). Again, the implementation of this step depends on the MD mode and the network layer protocol being used, and is described in more detail above.

The set-up stage is now complete and the set-up process terminates at block 512.

5.2. Normal Operational Stage

5.2.1. Updating Neighborhood Lists

The neighborhood list in each node needs to be updated periodically. During this period, a node needs to listen to all its neighbors, get their ID and Rx/Tx timing, and updates its neighborhood list. In its next Tx time, a node can also send out a "Hello" or "W" message to all its neighbors individually.

This routine is exactly the same as a MD operation. When a node is a MD, it will receive for a period of time. During this period, it will receive "Query" messages from its neighbors. These "Query" messages can be used as "W" or "Hello" messages and are used to update the MD's neighborhood list. During the next period, the MD is required to answer all these "Query" messages. The MD can use these reply messages as its own "Hello" messages to send to all of its neighbors.

5.2.1.1. Distributed MD

In the Distributed MD case, since the operation of updating a neighborhood list and being a MD is almost identical, every node will be a MD during the time when it needs to update its neighborhood list. In other words, the updating period for a node's neighborhood table is the same as the node's periodic MD period.

5.2.1.2. Dedicated MD

In the Dedicated MD case, all the nodes that are Dedicated MDs can update their neighborhood table at anytime. For the nodes that are not Dedicated MDs, each one has a "normal neighborhood list" and a "Non-sync neighborhood list".

5.2.1.2.1. "Normal Neighborhood List"

The "normal neighborhood list" needs to be updated periodically. This can be done with the help of the Dedicated MD. When a member node needs to update its "normal neighborhood list", it sends a "Req. Sync All" message to the Dedicated MD. The Dedicated MD then asks all nodes to synchronize with the member node for the next period. The member node can then broadcast a "Hello" message in its next Tx period. All nodes within both the member node's range and the Dedicated MD's range can hear this message, and update their neighborhood table accordingly. For the nodes that are in the Dedicated MD's range, but not in the member node's range (such as nodes 5, 8, 9, 10 in FIG. 3), they will not hear this "Hello" message and therefore will not add/update the member node in their neighborhood lists.

If location information is available, a more efficient scheme can be used. If the Dedicated MD knows the location of all nodes in its range, then a member node only needs to send a "Hello" message to the Dedicated MD. The Dedicated MD can forward this "Hello" message to only the nodes that are within the member node's communication range. This saves the all the nodes from having to synchronize with the member node and listen for its "Hello" message in its next Tx period.

5.2.1.2.2. "Non-sync Neighborhood List"

For updating the "Non-sync neighborhood list", the nodes need to switch to a temporary MD mode and check the status of all nodes in its "Non-sync neighborhood list". Another option is to combine the Distributed and Dedicated MD scheme described below.

5.2.1.3. Combine Distributed with Dedicated MD

In the Dedicated MD case, if the location of the Dedicated MDs are not planned carefully ahead of time, there can be nodes in the network that are not covered by any Dedicated MDs, such as node B (CID=21, Node 5) and node A(CID=21, Node 11) in FIG. 3. For these "non-MD covered" nodes, all they have are their "Non-sync neighborhood list". They will have to turn into temporary MDs when they need to update their "Non-sync neighborhood list", or when they need to transmit any messages. For the border nodes such as Node 2 in FIG. 3, they can wait till the "non-MD covered nodes" send in their "Hello" messages and then update their "Non-sync neighborhood list". These border nodes do not need to turn into MDs themselves to update their "Non-sync neighborhood list".

The frequency in which the "Non-sync neighborhood list" needs to be updated depends on the network delay requirement and how often the network topology changes (how often nodes are added/deleted or move in/out of the network). This frequency requirement in turn will dictate how often nodes turn into MDs in the Distributed MD case, and how often the nodes turn into temporary MDs in the Dedicated MD case or the "combine Distributed with Dedicated MD" case.

5.2.2. Transmitting Normal Messages

If a node wants to talk to a neighbor, it will send a "Req. Sync" message to the MD, the MD will send an "Ack" back to the requester and relay the message to the corresponding node. This process is described in detail in "Mediation Device Operation", Qicai Shi, Ed Callaway, Document IEEE 802.15-01/1880r0.

5.2.3. Summary of Normal Operation Stage

Figure 6:
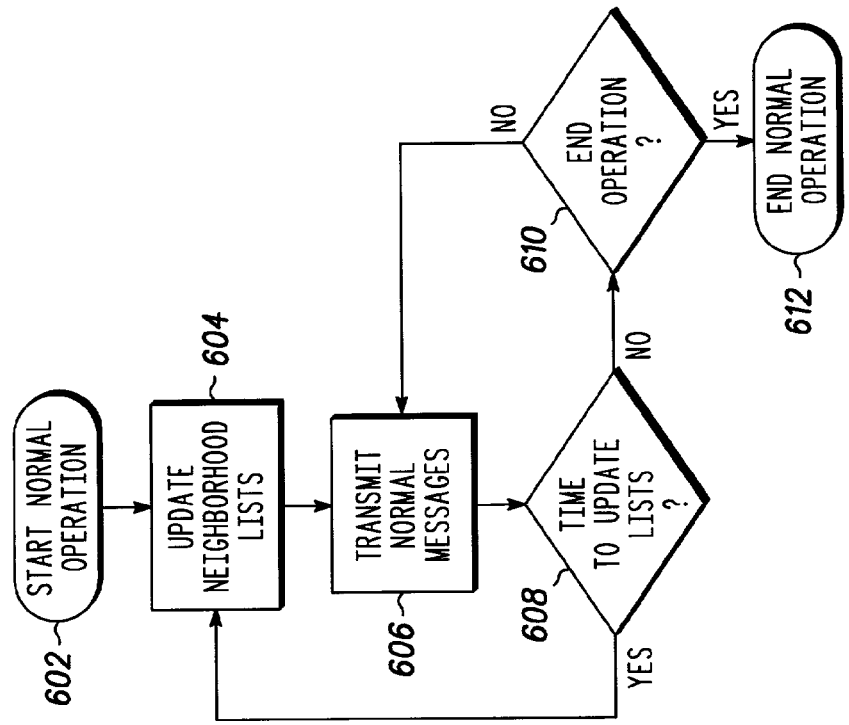
FIG. 6 is a flow chart illustrating normal operation of the network in accordance with an embodiment of the present invention.

A flow chart summarizing the normal operation of a network node is shown in FIG. 6. Following start block 602, the neighborhood list is updated at block 604. The neighborhood list in each node needs to be updated periodically, since the network topology may have changed. During this period, a node needs to listen to all its neighbors, get their ID and Rx/Tx timing, and updates its neighborhood list. In its next Tx time, a node can also send out a "Hello" or "W" message to all its neighbors individually. This routine is exactly the same as a MD operation. When a node is a MD, it will receive for a period of time. During this period, it will receive "Query" messages from its neighbors. These "Query" messages can be used as "W" or "Hello" messages and are used to update the MD's neighborhood list. During the next period, the MD is required to answer all these "Query" messages. The MD can use these reply messages as its own "Hello" messages to send to all of its neighbors. The node then transmits and receives normal messages at block 606. For example, if a node wants to talk to a neighbor, it will send a "Req. Sync" message to the MD, the MD will send an "Ack" back to the requester and relay the message to the corresponding node. This process is described in detail in "Mediation Device Operation", Qicai Shi, Ed Callaway, Document IEEE 802.15-01/1880r0.

At decision block 608, a check is made to determine if it is time to update the neighborhood list again. This check may be made explicitly by polling a timer or counter, or the check may be implicit, in which case the update is made in response to a timer event. When it is time to update the neighborhood list again, as depicted by the positive branch from decision block 608, flow returns to block 604. If it is not time to update the neighborhood list, as depicted by the negative branch from decision block 608, flow continues to decision block 610. If operation is not to be ended, as depicted by the negative branch from decision block 610, flow returns to block 606. If operation is to be ended, as depicted by the positive branch from decision block 610, normal operation ends at block 612.

5.3. Effect of MD's Rotation on the Network Layer

5.2.4. Dedicated MD Case

In the Dedicated MD case, the rotation of MD nodes is not random. Only the nodes that are Dedicated MDs turn into MD mode periodically. Normal nodes do not need to turn into MD mode periodically. Because of this, the "Non-sync neighborhood list" of normal nodes are not necessary updated periodically. Therefore the inactive links between the normal nodes and their "Non-sync neighborhood list" may not be reliable. To use these inactive links also requires one of the nodes becoming a temporary MD, thus using more energy than normal active links (links between a normal node and its "normal neighborhood list"). It is therefore advantageous to use only the active links in the network layer to route information. In this case, the inactive links are not used, and therefore do not need to be updated. However, this is only useful if these active links do not change often. If the Dedicated MDs rotate often, causing these active links to change often as well, the control traffic for updating the active links becomes large. This makes using active links only in the network layer inefficient.

5.2.4. Distributed MD Case

When the MDs rotate often, such as in the Distributed MD case, not keeping track of active and inactive links can be a more efficient solution. The active and inactive links should be treated as equal in the network layer to route information. In this case, a node needs to turn into MDs periodically to update the status of all its neighbors. In addition, a node should also turn into MD mode to deliver messages when its buffer overflows or when messages have been in its buffer for longer than a threshold period.

5.2.4. Unknown MD Type

When it is not known whether a network is using Dedicated MD or Distributed MD or when there is a combination of Distributed and Dedicated MDs in the network, the network layer needs to identify which nodes are Dedicated MDs and which are Distributed MDs and to adjust its use of active and inactive links accordingly.

In one embodiment of the invention, a check is made of the amount of time a "Non-sync neighbor" switches to a "normal neighbor". If a node jumps between "Non-sync neighbor" and "normal neighbor" many times, then this indicates that the MDs are in the Distributed MD case and this "frequently jumping neighbor" should be in the "normal neighborhood list". If a node stays as a "Non-sync neighbor" consistently, then this can indicate that the MDs are in Dedicated MD case. The inactive link with this neighbor should not be used in normal network operations. This solution requires every node to be in temporary MD mode periodically and exchange neighborhood list with the MD. This needs to be done in the beginning until the node finds out which MDs are Dedicated and which are not.

In a further embodiment of the invention, Dedicated MDs are provided with a special Logical ID, thereby enabling the normal nodes to identify them easily.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Those of ordinary skill in the art will recognize that the present invention has been described in terms of exemplary embodiments based upon merging a Mediation Device Protocol with a Cluster Tree Protocol. However, the invention should not be so limited, since the present invention could be use to merge a Mediation Device Protocol with other network layer protocols.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for adding a new network node to a network, said method comprising:
   operating said new network node to discover neighboring nodes in the network;
   confirming symmetric communication links to neighboring nodes in the network;
   obtaining a logical identifier and selecting a parent node in the network for the new network node; and
   operating said new network node to broadcast status information to the neighboring nodes in the network;
   wherein each node has a plurality of transmit periods and receive periods and wherein said confirming symmetric communication links to neighboring nodes in the network comprises:
   causing said new network node to send out an alarm message, informing neighboring nodes to suspend transmission for a period;
   causing said new network node send a "Connection Request" message to the neighboring nodes; and
   causing the neighboring nodes to send a "Connection Response" message in their next transmit periods, thereby confirming that a symmetric link is in place.

2. A method an accordance with claim 1, wherein said operating said new network node to discover neighboring nodes in the network comprises:
   listening to messages transmitted between neighboring nodes in the network;
   collecting information about its immediate neighbors by listening to the messages; and
   recording the information in an initial neighborhood list.

3. A method in accordance with claim 2, wherein said information collected includes neighboring nodes' logical identifiers and times they will receive or transmit messages.

4. A method in accordance with claim 3, wherein said information collected includes depth information of the neighboring nodes if available and load information of the neighboring nodes if available.

5. A method in accordance with claim 1, wherein said network includes a cluster of nodes having a Cluster Head and operating under a Cluster Tree Protocol and wherein said obtaining a logical identifier and selecting a parent node in the network for the new network node comprises:
   selecting a node from the neighborhood list as the parent node;
   causing said new network node to send a "Logical ID Request" message to the Cluster Head;
   causing said Cluster Head to send a "Logical ID Response" message to the parent node; and
   causing the parent node to relay the "Logical ID Response" message to the new network node.

6. A method in accordance with claim 1, wherein said network includes a cluster of nodes having a Cluster Head and operating under a Cluster Tree Protocol and wherein said obtaining a logical identifier and selecting a parent node in the network for the new network node comprises:
   identifying a neighboring node that is a Dedicated Mediation Device;
   sending a "Neighborhood List Request" message to the Dedicated Mediation Device;
   receiving a "Neighborhood List Response" message from the Dedicated Mediation Device, the "Neighborhood List Response" message providing a list of the Dedicated Mediation Device neighbors;
   deleting nodes from the neighborhood list that do not appear on the Dedicated Mediation Device's neighborhood list;
   selecting a node from the neighborhood list as the parent node;
   causing said new network node to send a "Logical ID Request" message to the Cluster Head;
   causing said Cluster Head to send a "Logical ID Response" message to the parent node; and
   causing the parent node to relay the "Logical ID Response" message to the new network node.

7. A method in accordance with claim 6, further comprising storing deleted node information in a non-synchronized neighborhood list of the new network node.

8. A method in accordance with claim 1, wherein said network includes a cluster of nodes having a Cluster Head and operating under a Cluster Tree Protocol and wherein said obtaining a logical identifier and selecting a parent node in the network for the new network node comprises:
   selecting a node with the least depth from neighborhood list as the parent node;
   causing said new network node to send a "Logical ID Request" message to the Cluster Head;
   causing said Cluster Head to send a "Logical ID Response" message to the parent node; and
   causing the parent node to relay the "Logical ID Response" message to the new network node.

9. A method in accordance with claim 8, wherein if more than one node from the neighborhood list has the least depth, a node with the least load is selected as the parent node.

10. A method in accordance with claim 1, where in said network includes a cluster of nodes having a Cluster Head and operating under a Cluster Tree Protocol and wherein said obtaining a logical identifier and selecting a parent node in the network for the new network node comprises:
    identifying a neighboring node that is a Dedicated Mediation Device;
    sending a "Neighborhood List Request" message to the Dedicated Mediation Device;
    receiving a "Neighborhood List Response" message from the Dedicated Mediation Device, said "Neighborhood List Response" message providing a list of the Dedicated Mediation Device's neighbors;
    deleting nodes from the neighborhood list that do not appear on the list of the Dedicated Mediation Device's neighbors;
    selecting a node with the least depth from the neighborhood list as the parent node;
    causing said new network node to send a "Logical ID Request" message to the Cluster Head;
    causing said Cluster Head to send a "Logical ID Response" message to the parent node;
    causing the parent node to relay the "Logical ID Response" message to the new network node.

11. A method in accordance with claim 10, wherein if more than one node from the neighborhood list has the least depth, a node with the least load is selected as the parent node.

12. A method in accordance with claim 1, where in said network includes a cluster of nodes have a Cluster Head and operating under a Cluster Tree Protocol, wherein said operating said new network node to broadcast status information to the neighboring nodes in the network comprises:
    operating said new network node to monitor message between neighboring nodes in the network;

updating the timing information from the neighboring nodes in the network; and sending a "1$^{st}$ Hello" message to each neighbor node.

13. A method in accordance with claim 12 wherein said "1$^{st}$ Hello" message includes the new network node's logical identifier.

14. A method in accordance with claim 13, wherein said "1$^{st}$ Hello" message includes the new network node's depth and load parameters and, optionally, the identifier of its parent node.

15. A method in accordance with claim 13, wherein said "1$^{st}$ Hello" message includes the logical identifier of a Dedicated Mediation Device in the area of the new network node.

16. A method in accordance with claim 15, wherein neighboring nodes having the same Dedicated Mediation Device as the new network node add the new network node to their neighborhood lists.

17. A method in accordance with claim 15, wherein neighboring nodes have Non-synchronized neighborhood lists and neighboring nodes having a different Dedicated Mediation Device to the new network node add the new node to their Non-synchronized neighborhood list.

18. A method in accordance with claim 1, wherein said status information comprises a logical identifier and depth and load parameters of the new network node, and, optionally, an identifier of the parent node.

19. A method for adding a new network node to a network, said method comprising:

identifying neighboring nodes that have symmetric communication links with the new network node;

generating a neighborhood list of neighboring nodes that have symmetric communication links with the new network node;

operating said new network node to broadcast status information to the neighboring nodes in the network; and operating said new network node to send messages to said neighboring nodes and to receive messages from said neighboring nodes;

wherein the network includes at least one Dedicated Mediation Device and wherein said neighborhood list comprises a first neighborhood list containing information about nodes sharing the same Dedicated Mediation Device as the new network node and a second neighborhood list containing information about nodes having a different Dedicated Mediation Device.

20. A method in accordance with claim 19, further comprising:

periodically listening to network messages;

retrieving information from said network messages; and updating the neighborhood list according to said information.

21. A method in accordance with claim 20, wherein said information includes the identifiers and the receive and transmit times of said neighboring nodes.

22. A method in accordance with claim 20, further comprising transmitting a "Hello" or "W" message from said new network node to all of the neighboring network nodes.

23. A method in accordance with claim 20, wherein said network messages include "Query" messages.

24. A method in accordance with claim 19, wherein the new network node operates as a Distributed Mediation Device.

25. A method in accordance with claim 19, wherein operating said new network node to send messages to said neighboring nodes comprises:

transmitting a "Req. Sync" message from said new network node to a Mediation Device;

transmitting an "Ack" message from the Mediation device back to the new network node; and relaying the "Req. Sync" message to the appropriate neighboring network node.

26. A method for a new network node to identify Mediation Devices in a network containing normal and non-synchronized neighboring nodes, said method comprising:

determining if a neighboring node switch between being a non-synchronized neighboring node and a normal neighboring node;

determining the Mediation Devices to be a Dedicated Mediation Device if the neighboring node does not switch between being a non-synchronized neighboring node and a normal neighboring node; and determining the Mediation Devices to be a Distributed Mediation Device if the neighboring node switches between being a non-synchronized neighboring nodes and a normal neighboring node.

* * * * *